(12) United States Patent
Bootz et al.

(10) Patent No.: US 8,162,095 B2
(45) Date of Patent: Apr. 24, 2012

(54) VEHICLE STEERING SYSTEM OF THE BY-WIRE DESIGN TYPE

(75) Inventors: Andreas Bootz, Munich (DE); Norbert Nitzsche, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/916,938

(22) Filed: Nov. 1, 2010

(65) Prior Publication Data

US 2011/0094820 A1   Apr. 28, 2011

Related U.S. Application Data

(63) Continuation of application No. PCT/EP2009/002408, filed on Apr. 2, 2009.

(30) Foreign Application Priority Data

May 2, 2008 (DE) .......................... 10 2008 021 973

(51) Int. Cl.
*B62D 5/06* (2006.01)

(52) U.S. Cl. .................. 180/406; 180/405; 180/403

(58) Field of Classification Search ............ 180/406, 180/405, 403
See application file for complete search history.

(56) References Cited

U.S. PATENT DOCUMENTS

| | | | |
|---|---|---|---|
| 5,893,428 A | 4/1999 | Fasse et al. | |
| 5,896,942 A | 4/1999 | Bohner et al. | |
| 6,213,246 B1 | 4/2001 | Bohner et al. | |
| 6,279,675 B1 * | 8/2001 | Bohner et al. | 180/403 |
| 6,502,661 B1 * | 1/2003 | Heitzer | 180/403 |
| 6,612,393 B2 * | 9/2003 | Bohner et al. | 180/405 |
| 6,923,290 B1 * | 8/2005 | MacLeod et al. | 180/403 |
| 7,364,482 B1 * | 4/2008 | Wong et al. | 440/1 |
| 7,694,776 B2 * | 4/2010 | Rathke et al. | 180/406 |

FOREIGN PATENT DOCUMENTS

| | | |
|---|---|---|
| DE | 196 25 503 C1 | 10/1997 |
| DE | 196 17 566 A1 | 11/1997 |
| DE | 198 01 393 C1 | 7/1999 |
| DE | 198 38 490 A1 | 12/1999 |
| DE | 100 40 870 A1 | 5/2001 |
| DE | 100 46 168 A1 | 3/2002 |
| DE | 101 02 244 A1 | 3/2002 |
| DE | 101 35 862 A1 | 3/2002 |
| DE | 102 45 975 A1 | 4/2004 |
| EP | 1 213 205 B1 | 6/2002 |
| GB | 2 395 469 A | 5/2004 |

OTHER PUBLICATIONS

German Search Report dated Mar. 19, 2010 with Partial English translation (nine (9) pages).
International Search Report dated Jun. 24, 2009 with Eglish translation (six (6) pages).

* cited by examiner

*Primary Examiner* — Joanne Silbermann
*Assistant Examiner* — Marlon Arce
(74) *Attorney, Agent, or Firm* — Crowell & Moring LLP

(57) ABSTRACT

A vehicle by-wire steering system includes a hydraulic default level. A hydraulic feed unit and a hydraulic actuating unit can be connected together by two hydraulic lines such that when an actuator is non-functional, a steering wheel rotational angle is transformed into a corresponding wheel steering angle by the hydraulic feed unit and the hydraulic actuating unit. The hydraulic lines can be connected together by a switchable steering valve, which is designed as a proportional servo valve, of which the flow cross section can be adjusted in essence continuously between the two extremes of completely closed and completely open.

12 Claims, 3 Drawing Sheets

VEHICLE STEERING SYSTEM OF THE BY-WIRE DESIGN TYPE

CROSS-REFERENCE TO RELATED APPLICATIONS

This application is a continuation of PCT International Application No. PCT/EP2009/002408, filed Apr. 2, 2009, which claims priority under 35 U.S.C. §119 from German Patent Application No. DE 10 2008 021 973.8, filed May 2, 2008, the entire disclosures of which are herein expressly incorporated by reference.

BACKGROUND AND SUMMARY OF THE INVENTION

The invention relates to a vehicle steering system of the by-wire design type without any mechanical linkage between the driver's steering wheel and a steering gearbox, which initiates a steering movement of at least one steerable wheel of the vehicle, where the steering movement is specified by the driver by way of the steering wheel. An actuator, which is actuated by an electronic control unit with signals from the steering wheel input, can act on the steering gearbox. This steering system also has a hydraulic default level, which has a hydraulic feed unit, coupled to the steering wheel, and a hydraulic actuating unit, which is coupled to the steering gearbox or forms the same. The hydraulic feed unit and the hydraulic actuating unit can be connected together by way of two hydraulic lines in such a manner that when the actuator is non-functional, the steering wheel rotational angle input with the steering wheel is transformed into a corresponding wheel steering angle by use of the hydraulic feed unit and the hydraulic actuating unit. These two hydraulic lines between the hydraulic feed unit and the hydraulic actuating unit can be connected together by a switchable so-called steering valve. With respect to the relevant prior art reference is made, by way of example, to DE 198 01 393 A1.

The so-called steer-by-wire systems, in which the steering request input by the driver of the vehicle at the steering wheel or the like (instead of a steering wheel, a so-called side stick or the like can be provided as the so-called steering control element—for the sake of simplicity only one steering wheel is discussed below, and with respect to operating this steering wheel, the steering wheel rotational angle is discussed) is not transmitted to the steerable wheels of the vehicle by the direct mechanical route—that is, as in the case of the conventional modern vehicles by way of the so-called steering column or rather the steering spindle as well as a steering gearbox, coupled thereto (for example, a rack and pinion steering gearbox)—but rather by the electric or hydraulic route, are advantageous with respect to the configuration possibilities for the system components in the vehicle. With such steer-by-wire systems a steering angle can be adjusted, even independently of the driver's input, in an advantageous way at the steerable wheels, for example, to the effect that, as a consequence, an unstable driving condition is counteracted. Expressed in general terms, the steer-by-wire system does not exhibit a fixed correlation between a steering input, set at the steering wheel (=steering wheel rotational angle), and the steering movement (=wheel steering angle), executed at the steerable wheels of the vehicle on the basis of this steering input, so that it is possible to achieve in an advantageous manner a so-called variable steering ratio between the steering wheel rotational angle and the wheel steering angle that can also be changed, for example, as a function of the vehicle speed.

Since in steer-by-wire systems a variety of built-in sensors, but in particular also the actuator, which is actuated by signals of the steering wheel input and, as a result, pivots the steerable wheels, can fail, these systems provide a so-called default level, which in view of a desired design flexibility is configured, for example, hydraulically and can include features such as a hydraulic feed unit, which is coupled to the steering wheel, and a hydraulic actuating unit, which is coupled to the steering gearbox and which can form by itself the steering gearbox in a specific embodiment, as well as a hydraulic circuit, which hydraulically connects together these two units.

This hydraulic circuit has at least two hydraulic lines, by which the hydraulic actuating unit, induced by the hydraulic feed unit, is able to pivot the steerable wheels into the one or into the other direction, for which reason both the hydraulic feed unit and also the hydraulic actuating unit exhibit two "working directions," which are directed opposite to one another, starting, for example, from a center position or zero position. However, the hydraulic feed unit can cause a pivoting movement of the steerable wheels by way of the hydraulic actuating unit, only if between the two hydraulic lines, by which the hydraulic actuating unit can be moved into the one or into the other direction, there is no short circuit. In the prior art such a short circuit is produced by way of a so-called short circuit line, which has a simple shut-off valve, which can be either closed or completely opened, by opening this shut-off valve, when the hydraulic default level is not supposed to be effective. In this case, when the hydraulic feed unit is actuated, the hydraulic medium is merely recirculated from one side of this feed unit by way of the open short circuit line to the other side of this feed unit. In contrast, this shut-off valve, which is called a steering valve, is or remains closed, when the hydraulic default level has to be effective, for example, due to a malfunction of the actuator or by its actuation.

Furthermore, the known steer-by-wire systems have a so-called steering torque simulator, with the aid of which a torque, directed opposite the steering torque generated by the driver, can be applied to the steering wheel, in order to give the driver a typical steering feeling and, thus, a quasi tactile contact with the road. In the prior art this steering torque simulator is formed by an electric motor, which acts on the steering wheel and is suitably actuated by an electronic control unit, so that a so-called hand torque or rather so-called hand forces is (are) adjusted at the steering wheel as a function of the different boundary conditions to be considered.

However, such an independent steering torque simulator in the form of a complex electric motor to be actuated represents an expense that would be desirable to avoid, for which reason the present invention proposes a much simpler vehicle steering system, which can adjust in a targeted way a hand torque that can be sensed by the driver at the steering wheel.

The solution to this problem is characterized in that the steering valve is designed as a proportional servo valve, of which the flow cross section can be adjusted in essence continuously between the two extremes "completely closed" and "completely open." Even in the event of a functional actuator, this steering valve is not held in its completely open position, but rather in the closed position or is moved into a partially open position, when the intent is to cancel the essentially fixed correlation between the steering wheel rotational angle and the wheel steering angle when the steering valve is closed. The actuator is actuated at least when the steering valve is totally closed in such a way that a desirable so-called hand torque, which the driver can sense and which is a function of at least one boundary condition, adjusts for the respective steering process at the steering wheel.

Working on this basis, the steering system according to the invention may be of the so-called by-wire design type, but is not operated as a by-wire system in the pure form in the bulk of the standard operating points, but rather in a mixed form between a by-wire operation and an activated default level. In this context the hydraulic default level is switched on completely or proportionally as a function of the actuation of the steering valve; at the same time the elements of the so-called by-wire area are activated. Thus, in the presence of a driver's steering request the hydraulic feed unit and the actuator for implementing this steering request work side by side in parallel. As a result, the driver will obtain basically a hand torque at his steering wheel by means of the hydraulic feed unit. In any case when the steering valve is closed and, hence, when the default level is totally activated, the actuator ensures that this hand torque takes on a certain (desired) amount.

If this steering valve, which enables or prevents a short circuit between the two hydraulic lines of the default level, is held in its closed position even if the actuator is functional, then a wheel steering angle can be adjusted as a function of a specified steering wheel rotational angle by means of this default level, and at the same time a desired hand torque at the steering wheel can be adjusted by suitably actuating the actuator. The latter is actuated in such a manner that when the driver turns the steering wheel and the wheel steering angle is adjusted, the steering gearbox causes a build-up of the hydraulic differential pressure in the two hydraulic lines. Induced by the resistance, opposing the steerable wheels at their steering angle, and implemented by the hydraulic feed unit, this differential pressure results in a desired hand torque at the steering wheel. The latter (the hand torque) can be a function of the boundary conditions—that is, in particular the speed of the vehicle.

Since the hydraulic default level, which is present in any event and is necessary for safety reasons, is used to generate a hand torque at the steering wheel, there is no need for an expensive independent steering torque simulator. At the same time, when the steering valve is closed, there exists a fixed correlation between the steering wheel rotational angle and the wheel steering angle, with the exception of deviations that result from the elasticity of the hydraulic transfer between the hydraulic feed unit and the hydraulic actuating unit.

In addition, the steering system according to the invention makes it possible to cancel this aforementioned fixed correlation between the steering wheel rotational angle and the wheel steering angle, so that an additional advantageous property of a steer-by-wire system can be used—that is, a wheel steering angle that deviates from the driver's input can be adjusted, a feature that can be used, as is well known, for example, for stabilizing an unstable driving condition. This feature is achieved in a steering system according to the invention in that the steering valve, which can be designed, of course, not only as a one-way valve, but also as a multi-way valve, can take up not only discrete switching positions in so-called end positions, but also any intermediate position. Consequently, this steering valve is a so-called proportional servo valve, which can produce not only either a 100% short circuit between two hydraulic lines or can totally suppress such a short circuit—as is the case with a valve that enables only two discrete switching positions—but rather such a proportional servo valve, provided between two hydraulic lines, can also produce a partial short circuit (for example, a so-called 50% short circuit) between these hydraulic lines.

If the steering valve is moved, as a function of the situation, into a partially open position, which produces a partial short circuit between the two hydraulic lines between the hydraulic feed unit and the hydraulic actuating unit, then the fixed correlation between the steering wheel rotational angle and the wheel steering angle is cancelled. When such a partial short circuit occurs, only a portion of the hydraulic medium, pumped by means of the hydraulic feed unit in the course of the driver's steering process, flows into the hydraulic actuating unit, whereas the other portion of the hydraulic medium, pumped by the hydraulic feed unit into one of the two hydraulic lines, then flows back to the other side of the feed unit by way of the other of these two hydraulic lines. Thus, when such a partial short circuit is produced, the steering wheel is uncoupled to some extent from the steering gearbox in such a manner that a steering wheel rotational angle input by the driver is only partially transformed into a wheel steering angle, so that consequently the so-called steering ratio between an input of a wheel steering angle and the subsequently adjusted wheel steering angle is changed. While in the case of a completely closed steering valve a steering wheel rotational angle of 90° induces, for example, a wheel steering angle of 5°, it is possible to generate with a steering wheel rotational angle of 90° a wheel steering angle of only 2.5°, when a 50% short circuit is produced by means of the steering valve, as a result of which only half of the amount of hydraulic medium that is displaced by the hydraulic feed unit flows into the hydraulic actuating unit. When such a short circuit between the two hydraulic lines is produced, the counter-torque or hand torque, applied at the steering wheel by the steered wheels by way of the hydraulic actuating unit and the hydraulic feed unit, is correspondingly less.

If, instead of the partial short circuit between the two hydraulic lines, a complete short circuit were to be produced between these lines by opening completely the steering valve, then no hydraulic medium would flow at all from the hydraulic feed unit into the hydraulic actuating unit, so that no torque could be introduced by the steering wheel into the steering gearbox by the hydraulic route. Consequently, no wheel steering angle at all would be produced under the influence of the hydraulic feed unit, and the hand torque, which the driver could feel at the steering wheel, would be exclusively the result of reverse circulation of the hydraulic medium from one side of the hydraulic feed unit to the other side of the same.

However, when a partial short circuit between the two hydraulic lines is produced, then just the desired wheel steering angle can be adjusted by means of the actuator. From the resulting pivoting movement of the steerable wheels a counter-torque can be transmitted proportionally as the hand torque to the driver at his steering wheel as a function of the resulting partial short circuit. It is also possible to adjust at the steering wheel a wheel steering angle according to a suitable arithmetic routine stored in an electronic control unit using the actuator with simultaneous evaluation of the signals of the rotational angle sensor such that the driver does not have to be conscious of this procedure at his steering wheel, after the fixed correlation that exists between the steering wheel rotational angle and the wheel steering angle when the steering valve is closed has been cancelled. In particular, it is then possible to set wheel steering angles that can stabilize a potentially unstable driving condition of the vehicle. To what extent the driver can detect such wheel steering angle adjustments that deviate from his input at his steering wheel depends, in particular, on the size and/or range of the respective short circuit produced with the steering valve.

In principle, then with this engineering measure it is possible to adjust not only a wheel steering angle, which deviates from the driver's steering input, for the purpose of stabilizing the driving condition of the vehicle, but it is also possible with this engineering measure to change the steering ratio, which has already been described in brief above, between the steering wheel and/or a steering wheel rotation angle input with the steering wheel, and the resulting wheel steering angle. If, for example—as described above—the hydraulic medium, which is pumped by the hydraulic feed unit through the first hydraulic line, flows away from the pressure side of this feed unit, while hydraulic medium then flows through the other hydraulic line to this feed unit and, in so doing, can flow back, as it were, to the intake side of the same, then in the case of a so-called 30% short circuit by definition only 30% of the pumped hydraulic medium, flowing into the first hydraulic line, is recirculated back through the second hydraulic line to the intake side of the feed unit. Therefore, in the case of such a 30% short circuit, 70% of the steering input by the driver is implemented via the hydraulic default level, so that without the use of actuator the driver senses the counter-torque, resulting from the corresponding wheel steering angle, as a hand torque at the steering wheel. This hand torque can be reduced to the desired value by suitably actuating the actuator in that this actuator introduces a suitable boost torque into the steering gearbox.

In the case of a so-called 60% short circuit, only 40% of the steering input by the driver is implemented by way of the hydraulic default level, so that without the use of the actuator the driver once again senses the counter-torque, which results from the corresponding wheel steering angle and which is naturally less than in the case of a 30% short circuit under otherwise unchanged boundary conditions, as a hand torque at the steering wheel. Even this hand torque can be reduced to an even lower desired value by suitably actuating the actuator in that this actuator introduces a suitable boost torque into the steering gearbox.

In the case of a so-called 0% short circuit, 100% of the steering input by the driver is implemented by way of the hydraulic default level, so that without the use of the actuator the driver once again senses the counter-torque, which results from the corresponding wheel steering angle and which is higher than in the two preceding cases, as a hand torque at the steering wheel. Once again this hand torque can be reduced to a desired value by suitably actuating the actuator in that this actuator introduces a suitable boost torque into the steering gearbox.

This described adaptation of the steering ratio with simultaneous adjustment of the hand torque by way of the hydraulic default level is possible, if the steering torque or hand torque applied by the driver is directed opposite the steering direction—that is, for example, while parking or steering out of the steering center at a higher vehicle speed. In this case the steering ratio can be reduced by opening the steering valve, because then the hydraulic medium can flow out of that one of the two hydraulic lines, in which a higher pressure level prevails, into the other of the two hydraulic lines, in which a lower pressure level prevails, by way of the steering valve.

In contrast, when the steering movement and the hand torque or steering torque are in the same direction, as is the case, for example, when steering back into the neutral position under the effect of a standard resetting torque that centers the steering, the steering ratio or the hand torque is not adapted arbitrarily, because in this case the pressure differential between the two hydraulic lines is the inverse of the above described case, so that the hydraulic medium cannot be exchanged between the two hydraulic lines in the actually desired direction. If, however, the adjustment of a desired hand torque is of secondary importance—for example, especially in the event of executing vehicle dynamic management measures, where a so-called vehicle dynamic controller adjusts, independently of the driver, a specific wheel steering angle by means of the steering system according to the invention, in order to stabilize the handling of the vehicle—then an arbitrary steering angle can actually be set in the above described way, as in the case of a complete by-wire steering system.

Therefore, these aforementioned three exemplary cases illustrate that in the case of a vehicle steering system according to the invention, the steering ratio between the steering wheel and the related steerable wheels can be adjusted at least in certain driving situations by selecting an arbitrary so-called "short circuit component" by way of the steering valve that is designed as a proportional servo valve, and that at the same time a desired hand torque can be adjusted at the steering wheel by suitably actuating the actuator without having to have for this purpose an independent steering torque simulator. In addition, in extreme driving situations the steering angle and, thus, the steering ratio can be freely superimposed and/or adjusted, if the hand torque does not have to be adjusted in a defined way—that is, for example, in the event of very fast vehicle dynamic management measures with respect to the steering. The result is an extremely simple by-wire steering system, because its necessary (and consequently already existing) default level in interaction with the suitably actuated actuator forms the steering torque simulator. This suitable actuation of the actuator is taken over preferably by an electronic control unit, which provides for this purpose suitable input variables, for example also the differential pressure between the two hydraulic lines between the hydraulic feed unit and the hydraulic actuating unit, as a result of which this differential pressure can be taken into proper consideration even in the course of actuating the short circuit valve.

The hydraulic feed unit and the hydraulic actuating unit can be configured in the form of various design types known from the prior art. However, at the same time it ought to be possible to shift an element of this unit into both a first direction and also a second opposite direction, in order to enable a rotation or pivoting movement in both directions starting from a center position or zero position of both the steering wheel and the steerable wheels. For example, a hydraulic reversing motor can be used as such a hydraulic actuating unit, and a reversing pump, as the hydraulic feed unit. As an alternative suitable piston-cylinder units can be used.

Similarly, a variety of design types that are known from the prior art can be used for the steering gearbox and the actuator. In a first preferred embodiment, the actuator can be designed as an electric motor with a downstream transmission, which acts on the steering gearbox, which has a longitudinally shiftable gear element, of which both ends can be hinged to the tie rods assigned to the two steerable wheels. In this case the steering gearbox itself can be an essentially standard rack and pinion steering gearbox, to which is connected in series, as it were, a hydraulic actuating unit (for the default level) in the form of a cylinder-piston unit. In one possible alternative embodiment, the actuator can be designed as an electric motor that acts between the steering wheel and the hydraulic feed unit (as is also shown by one of the embodiments that are explained below with reference to the diagrammatic drawings).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
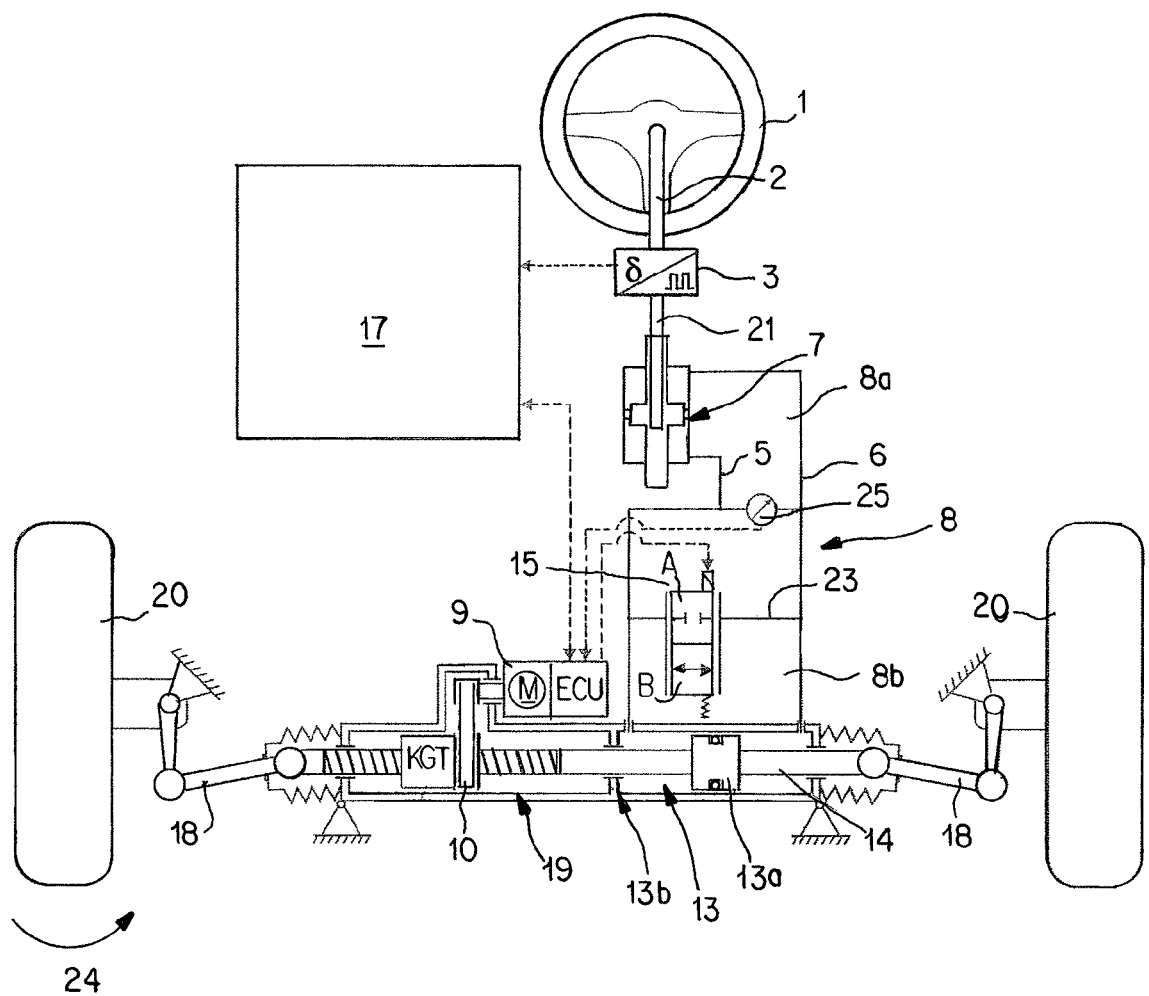
FIG. 1 is a schematic diagram illustrating a first embodiment in accordance with the present invention.

In the accompanying diagrammatic drawings (FIGS. 1, 2 and 3), which are explained below and depict three possible embodiments of the present invention, the identical and/or comparable elements are marked with the same reference numerals in each case.

Figure 2:
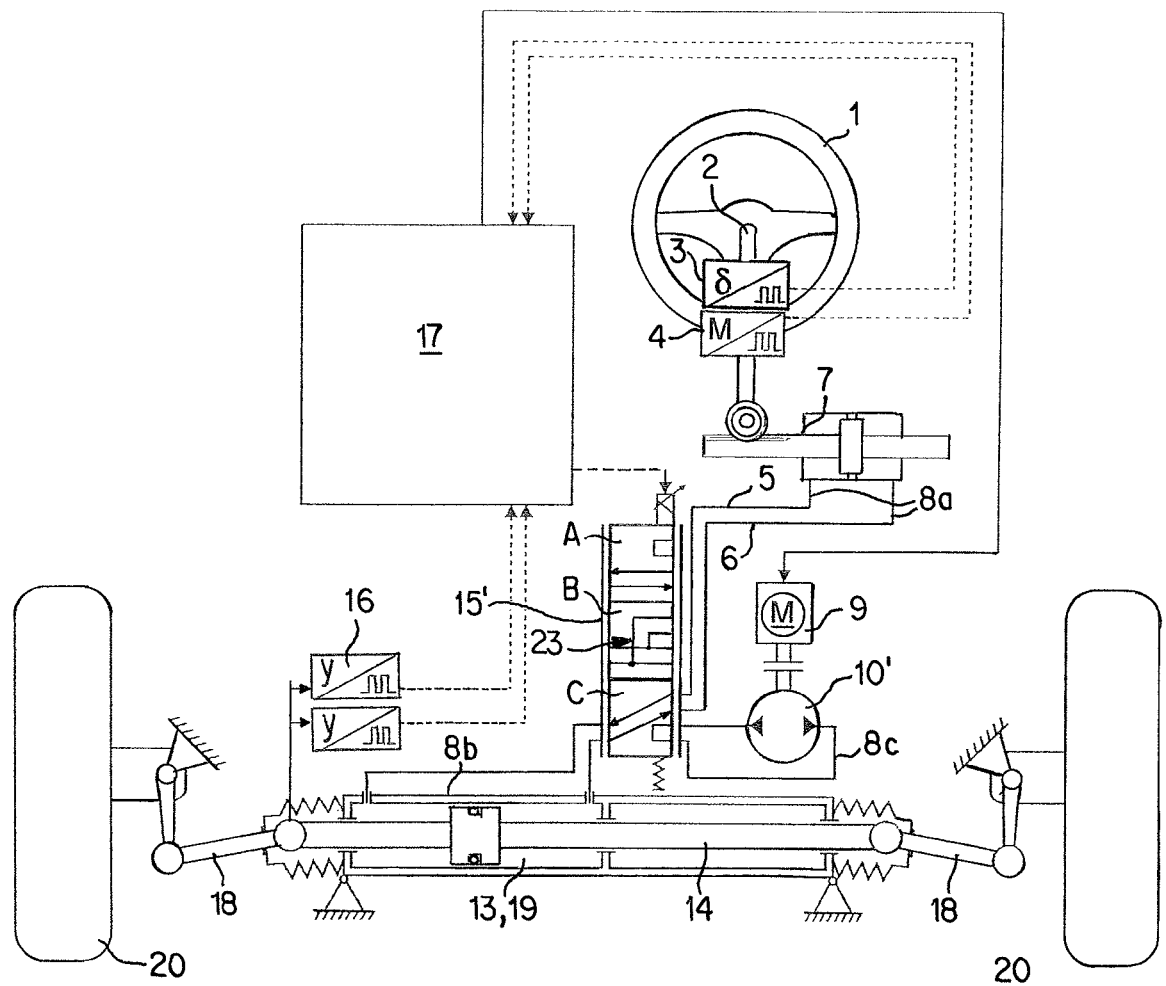
FIG. 2 is a schematic diagram illustrating a second embodiment in accordance with the present invention.
Figure 3:
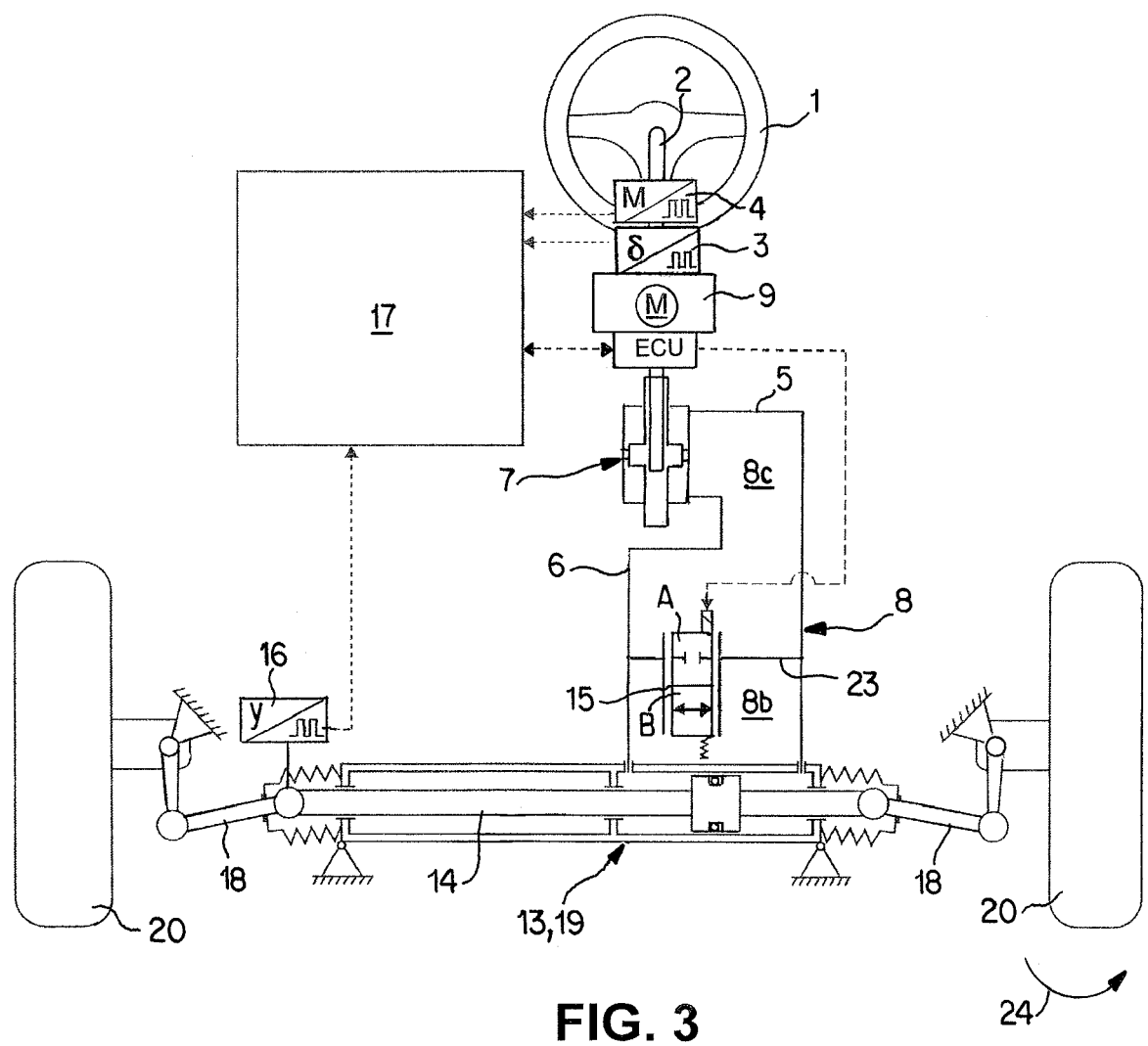
FIG. 3 is a schematic diagram illustrating a third embodiment in accordance with the present invention.

Working on this basis, a steering wheel, which is to be operated by the driver of the vehicle, bears the reference numeral 1. A rotational angle sensor 3, with which the steering angle input by the driver with his steering wheel 1 can be sensed, is integrated into the steering column 2, which is connected in a rotationally rigid manner to the steering wheel. In the embodiments of FIGS. 2 and 3, the steering column 2 has additionally a torque sensor 4, with which the steering torque input and/or the hand torque input by the driver at the steering wheel 1, can be sensed. It is self-evident that in addition to this design, other design variants can be provided.

In all of the embodiments, the end of the steering column 2 opposite the steering wheel 1 has a hydraulic feed unit 7 in the form of a piston-cylinder unit. With a rotational movement of the steering wheel 1 with simultaneous intervening operations of a suitable gear—in the embodiments according to FIGS. 1 and 3, it is in this case a spindle drive 21—the hydraulic feed unit (or rather its piston) pumps, as a function of the direction of rotation, a hydraulic medium in a so-called steering wheel sided part 8a of a hydraulic circuit 8 to the one or the other side—that is, into one of the two hydraulic lines marked with the reference numerals 5, 6. The two steerable wheels 20, i.e., the front wheels, of the two-track vehicle can be pivoted and, hence, steered in a manner that is known in principle from the prior art by way of steering arms and tie rods 18. These tie rods 18 are hinged to the two ends of a gear element 14, which can be shifted transversely to the longitudinal direction of the vehicle, in the form of a rod of a steering gearbox 19.

In the embodiment, which will be explained below in a first step and is depicted in FIG. 1, the steering gearbox 19 is designed in the manner of a rack and pinion steering gearbox, which is known to the person skilled in the art. The rack, which is elongated on both ends, forms the gear element 14 of the steering gearbox 19, and can be shifted laterally by an electric motor 9 by way of a continuous tension transmitting drive element 10 with a downstream ball screw. At the same time, this electric motor 9 together with the tension transmitting drive element 10 forms a so-called actuator, for which the reference numeral 9 is also used below. With suitable actuation by means of an electronic control unit 17, which considers, inter alia, the signals, which are sent by the rotational angle sensor 3, connected to the steering wheel 1, and which reflect the steering input of the driver, this actuator 9 can cause the corresponding displacement of the gear element 19 and, thus, a desired steering movement or pivoting movement of the wheels 20. In so doing, the position of the gear element 14 of the steering gearbox 19 can be transmitted by way of the evaluation of a rotor position sensor of the actuator 9 or with the aid of a position sensor (not illustrated) of the electronic control unit 17.

FIG. 1 shows that, furthermore, the gear element 14 is an essential part of a piston-cylinder unit, which acts as the so-called hydraulic actuating unit 13. In this context the gear element 14 forms the piston rod, which is elongated on both sides and is a part of the piston 13a of this hydraulic actuating unit 13. On both sides of the piston 13a, one of the two hydraulic lines 5, 6 empties into the interior of the cylinder 13b of this hydraulic actuating unit 13.

The two hydraulic lines 5, 6 can be connected together directly by hydraulic means via a so-called short circuit line 23, which has a so-called steering valve 15. This steering valve 15 is configured as a so-called proportional servo valve and can, therefore, either completely block or partially or completely open the short circuit line 23.

If the steering valve 15 occupies the position depicted in FIG. 1, then the short circuit line 23 is completely shut off, and a hydraulic medium, which is displaced in the direction of the hydraulic actuating unit 13 by the hydraulic feed unit 7, for example, in the hydraulic line 5, flows totally into the cylinder 13b of this hydraulic actuating unit 13—that is, to the left of its piston 13a as depicted in the figure. If, therefore, by rotating the steering wheel 1 the piston of the hydraulic feed unit 7 is moved downwards as depicted in the figure, then the hydraulic medium, which is displaced thereby into the hydraulic line 5 from the working chamber of the hydraulic feed unit 7 that lies below the piston, causes by way of the hydraulic actuating unit 13 a pivoting of the wheels 20 in the direction shown by the arrow 24, where a certain steering wheel rotational angle at the steering wheel 1 corresponds to a certain wheel steering angle. At the same time, the hydraulic medium is displaced (back) through the hydraulic line 6 into the hydraulic feed unit 7—and, in particular into the working chamber that lies above its piston in FIG. 1—from the chamber of the cylinder 13b that lies on the right of the piston 13a in FIG. 1.

If at variance with the drawing in the figure and the preceding description the short circuit valve 15 is in a position, in which the short circuit line 23 is totally open, then in the event of an identical rotational movement of the steering wheel 1, the hydraulic medium, which was displaced hereby from the lower working chamber (in the figure) of the hydraulic feed unit 7, is pumped into the hydraulic line 6 due to the lower resistance over the short circuit line 23 and through the hydraulic line into the working chamber that is a part of the hydraulic feed unit 7 and that lies above the piston of the hydraulic feed unit 7 in FIG. 1. In this switching position of the short circuit valve 15—that is, in the event of a rotational movement of the steering wheel 1—the hydraulic medium is recirculated by the hydraulic feed unit exclusively into the aforementioned steering wheel sided part 8a of the hydraulic circuit 8.

This last described state represents the typical operating state of known by-wire steering systems exhibiting a hydraulic default level. When a typical by-wire steering system (according to the past prior art) is totally functional, then the so-called hydraulic default level (to be discussed briefly in the following paragraph) is not active, and the steerable wheels 20 are pivoted, based on a rotational movement of the steering wheel 1, as described above, solely by means of the actuator 9 in interaction with the steering gearbox 19. In this context the hydraulic medium, which is displaced by a displacement of the piston 13a of the hydraulic actuating unit 13, is recirculated by way of a so-called steering gearbox sided part 8b of the hydraulic circuit 8, which has, inter alia, the hydraulic lines 5, 6 and the then open short circuit line 13.

Since, however, for example, the actuator 9 can fail and the vehicle must still remain steerable, nevertheless, there is the aforementioned default level, which is formed by the hydraulic feed unit 7, the hydraulic circuit 8 with the short circuit line 23, which is then shut off or blocked, and the hydraulic actuating unit 13. In the event that the actuator 9 or other important elements of the by-wire steering system fail—that is, when the "regular" steering gearbox 19 cannot be effective—then the steering valve 15 shuts off the short circuit line 23 under the influence of a spring force. Then steering can continue—as was already explained above—by means of the default level, which was activated as a result. That is, the steerable wheels 20 can be pivoted, as desired, starting from a rotational movement of the steering wheel 1. In this state, in which the "regular" steering gearbox 19 cannot be effective, the steering gearbox is formed practically by the hydraulic actuating unit 13.

At this point the present invention provides that the steering valve 15 can take up not only the two above described extreme positions—that is, either completely open or completely closed—but also any intermediate positions with suitable actuation preferably by means of the electronic control unit 17, for which reason this steering valve 15 is designed as a proportional servo valve. As was explained in detail prior to the description of the embodiments, the actuator 9 can be used to adjust a wheel steering angle that deviates from the input of the driver. In addition, it is possible—as also described above in detail—to change the so-called steering ratio between the steering wheel rotational angle and the wheel steering angle by suitably actuating the steering valve 15. When both the actuator 9 and the steering valve 15 are correspondingly actuated, the control unit 17 considers the various suitable measurement variables and boundary conditions—that is, in particular the steering input by the driver in the form of a steering wheel rotational angle, determined with the aforementioned rotational angle sensor 3, and, furthermore, the differential pressure between the two hydraulic lines 5, 6, which can be determined by means of a differential pressure sensor 25.

Hence, the invention proposes with the steering system, which has been explained so far, a vehicle steering system that includes a hydraulic force transfer and that exhibits, in particular, the following features.

The steering gearbox (19) consists of an electromechanical part and a hydraulic part. The electromechanical subcomponents are the electric motor (9), which can move the gear element (14) in both directions by means of a belt drive (10) and a ball screw. The hydraulic part consists of the hydraulic actuating unit (13), which is designed in essence as a steering cylinder and which can also be used for steering the system, and a steering valve (15), which can short-circuit the two chambers of the hydraulic actuating unit (13). The driver is connected to the hydraulic system by a hydraulic feed unit (7), which acts as a master cylinder and has a spindle drive (21). By means of the rotational movement at the steering wheel (1), the driver can build-up the pressure in one of the chambers of the hydraulic actuating unit (13) when the short circuit valve (15) is closed and, in this way, can move the steering system. Inversely, when a differential pressure develops in the chambers of the hydraulic actuating unit (13), the driver experiences a hand torque at the steering wheel (1). When the steering valve (15) is closed, the hydraulic system works like a hydraulic single circuit steering system, but at the same time no significant fraction of steering energy is transferred.

The function of this steering system can be described below once again.

The steering angle or rather steering request input by the driver is detected with a steering rotational angle sensor (3). The desired steering angle at the wheels (20) is also adjusted with the aid of the actuator (9) by means of the steering gearbox (19). The driver is connected to the steering gearbox (19) by way of the hydraulic system, including the hydraulic feed unit (7), the hydraulic circuit (8) with the steering valve (15) and the hydraulic actuating unit (13). This connection can be cancelled continuously with the aid of the steering valve (15) in such a manner that this steering valve (15) opens and the hydraulic single circuit steering system more or less short circuits, so that now a hydraulic force transfer by the hydraulic feed unit (7) (=master cylinder) and the hydraulic actuating unit (13) (=steering cylinder) is possible to some extent.

The steering system works basically by means of an electronic coupling between the detection of the driver's request and the adjustment of the steering angle at the steerable wheels (20). If the steering valve (15) is closed, then the driver's steering request can be implemented with the aid of the actuator (9), and at the same time the driver is given a hand torque at the steering wheel (1) by way of the hydraulic device. To this end, the actuator (9) has to be actuated in such a way that when the driver turns the steering wheel (1) and the steering gearbox (19) adjusts the wheel steering angle, a hydraulic differential pressure is built up in the hydraulic lines (5, 6), and this differential pressure, which is implemented by the hydraulic feed unit (7), results in a desired steering torque at the steering wheel (1). With the aid of the continuously adjustable steering valve (15), the fixed correlation between the steering wheel rotational angle and the wheel steering angle can be cancelled during the steering process—for example, for a vehicle dynamic control measure for stabilizing the vehicle. In this respect, the differential steering angle, which is adjusted at the same time, increases with the amount of hydraulic medium, which flows through the steering valve (15) during the steering process. Therefore, the engineering object of the control concept is to regulate two variables—that is, the wheel steering angle by way of the steering wheel rotational angle and/or the steering ratio and the hand torque of the driver. Similarly the actuating variables have two variables—that is, the current supply of the actuator (9) and the electric control current of the steering valve (15).

The system that is proposed so far makes it possible to cancel in a very simple way the coupling between the steering wheel rotational angle and the wheel steering angle especially for a vehicle dynamic management measure. When the actuator (9) at the steering gearbox (19) fails, the hydraulic single circuit steering system can be used for manual steering.

In the embodiment that is depicted in FIG. 2 and is described below, the steering gearbox 19 is formed exclusively by the hydraulic actuating unit 13. In this case the actuator 9, which acts during a "pure" by-wire operation—that is, when the default level is totally deactivated—is formed by means of a hydraulic reversing pump 10', which is driven by an electric motor 9 and which is integrated into a so-called actuator sided part 8c of the hydraulic circuit 8.

This hydraulic circuit 8, which has, furthermore, a steering wheel sided part 8a, which was described above with reference to FIG. 1, and a steering gearbox sided part 8b, which is also on hand in FIG. 1, has, instead of the steering valve 15, which is provided in FIG. 1 and is designed there as a one-way valve, a multi-way valve, which is referred to herein as a multi-way steering valve 15', and is also designed, in particular, as a proportional servo valve. In addition to the discrete switching positions A, B, C (shown in FIG. 2) of this multi-way steering valve 15' there is, thus, the possibility of any intermediate position between the switching positions A and B as well as B and C.

If this multi-way steering valve 15' is in the switching position A, then there exists a "pure" by-wire operation. In this position the actuator sided part 8c of the hydraulic circuit 8 is suitably connected to its steering gearbox sided part 8b, so that the hydraulic actuating unit 13 and, thus, the steering gearbox 19 is operated just by the actuator 9 as a function of its actuation by way of the electronic control unit 17. If, in contrast, this multi-way steering valve 15' is in the switching position C, then only the hydraulic default level is active. Consequently the steering wheel sided part 8a of the hydraulic circuit 8 is connected to its steering gearbox sided part 8b, so that the hydraulic actuating unit 13 and, thus, the steering gearbox 19 is operated only by the hydraulic feed unit 7, which is driven mechanically by the steering wheel 1. If, in contrast, the multi-way steering valve 15' is in the switching position B, then all of the parts 8a, 8b, 8c of the hydraulic circuit 8 are connected together by way of a short circuit. Hence, this switching position B of the multi-way steering valve 15' corresponds to the completely open position of the steering valve 15 according to FIG. 1 or FIG. 3. Depending on the position, last occupied by the multi-way steering valve 15' between the extreme positions A and C, the result is—analogous to the above described embodiment according to FIG. 1—a certain degree of the desired steering ratio between a steering wheel rotational angle and the subsequently executed wheel steering angle. In this case once again the magnitude of the so-called hand torque that the driver at the steering wheel 1 can feel is determined by the actuation of the electric motor 9 and, thus, herein by the pumping capacity of the reversing pump 10'.

Moreover, FIG. 2 shows both a redundancy position sensor 16, which transmits to the electronic control unit 17 the position of the gear element of the steering gearbox 19, as well as a torque sensor 4, which has already been described in the introductory part and which is located at the steering column 2. This torque sensor determines the hand torque applied at the steering wheel 1 and transmits to the electronic control unit 17 for the purpose of actuating the relevant elements of the steering system. Then, the so-called hand torque is represented by the hydraulic pressure differential in the steering gearbox 19 and/or in the hydraulic actuating unit 13. Then in order to modulate the pressure differential applied to the hydraulic feed unit 7, the multi-way steering valve 15' is continuously shifted between the switching position B and the switching position A. In this context the hydraulic feed unit 7 is designed and/or dimensioned such that in the switching position B of the multi-way steering valve 15', it is possible to generate the maximum vehicle dynamic steering torque. As the valve passes over into the switching position A, this steering torque steadily decreases.

Whereas, moreover, in the embodiment according to FIG. 2 as well as the embodiment that is described below and is depicted in FIG. 3, the steering column 2 has, besides the rotational angle sensor 3, additionally a torque sensor 4, the embodiment according to FIG. 1 does not provide a torque sensor. Owing to the direct drive that is achieved there between the steering wheel 1 and the hydraulic feed unit 7, no undesired influences between these two elements, such as the influences of friction or the rotational inertia of an intermediate transmission, can develop. As a result, instead of regulating the steering torque (with a then mandatory steering torque sensor for detecting the steering torque), it is possible to proceed to a control by means of signals of the rotational angle sensor 4.

Even in the case of the embodiment (explained below) according to FIG. 3, the steering gearbox 19 is formed exclusively by a hydraulic actuating unit 13. In this embodiment, the actuator 9, which is formed once again in the form of an electric motor and is actuated by the electronic control unit 17, is integrated into the steering column 2 between the steering wheel 1 and the hydraulic feed unit 7. In this case the positioning and/or displacement of the steering gearbox 19 with respect to pivoting the steerable wheels 20 always and completely takes place under the influence of the hydraulic feed unit 7. Consequently, when the steering valve 15 is closed, the essentially fixed correlation between the steering wheel rotational angle and the wheel steering angle can be cancelled in that the steering valve 15 is moved into a partially open position. However, then, a steering request input by the driver at the steering wheel can still be implemented, but with a steering ratio that is different than in the case of a completely closed steering valve 15. With this strategy it is, therefore, possible to correct errors in the correlation between the steering wheel rotational angle and the wheel steering angle, which can develop owing to possible leakages in the hydraulic system and which manifest themselves in a skewed steering wheel.

Moreover, it is also possible to set a specific steering ratio (which has already been mentioned multiple times), and in particular by means of the respective actuation of the steering valve 15, which is designed as a proportional servo valve, in a partial open position. Then the magnitude of the hand torque, which is perceptible to the driver as a consequence of the adjusted steering ratio at his steering wheel 1, can be adjusted by suitably actuating the actuator 9 in that this actuator provides the driver with a respective assist torque during the steering request input by the driver. Or in the case that a steering input in a certain direction is to be prevented, a corresponding counter-torque can be generated.

In principle, the steering system, depicted in FIG. 3, is simple with respect to its design, but should be supplemented with redundancy subcomponents, so that any failure of a single component would not result in a failure of the whole steering system. Furthermore, the steering system according to FIG. 3 is advantageous because the steering torque and/or the hand torque at the steering wheel 1 can be adjusted in a simpler and more accurate way by means of the direct linkage of the electric motor and/or actuator 9 to the steering column than in the case of the steering systems depicted in FIGS. 1 and 2

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A by-wire vehicle steering system providing a steering movement of at least one steerable wheel of a vehicle, the steering movement being input by a driver via a steering control element, the vehicle steering system comprising:
   a steering gearbox;
   an electronic control unit which receives an input signal from the steering control element;
   an actuator operatively arranged directly or indirectly upstream of the steering gearbox, the actuator being actuated by the electronic control unit;
   a hydraulic default system, the hydraulic default system having a hydraulic feed unit coupled to the steering control element and a hydraulic actuating unit coupled to the steering gearbox or forming the steering gearbox;
   wherein the hydraulic feed unit and the hydraulic actuating unit are coupleable by way of two hydraulic lines such that when the actuator is non-functional, a steering control element input is transformed into a corresponding wheel steering angle via the hydraulic feed unit and the hydraulic actuating unit, said two hydraulic lines between the hydraulic feed unit and the hydraulic actuating unit being connectable together;

a proportional servo steering valve by which the two hydraulic lines are connectable together, a flow cross-section of the proportional steering valve being continuously adjustable between completely closed and completely opened positions;

wherein even when the actuator is functional, the steering valve is not in the completely opened position, but rather in a closed position or in a partially opened position, when the system intends to cancel an essentially fixed correlation between the steering control element input and the wheel steering angle when the steering valve is closed; and wherein the actuator is actuated at least when the steering valve is completely closed such that a desired hand torque, which can be sensed by the driver and is a function of boundary conditions, adjusts for a respective steering process at the steering control element.

2. The vehicle steering system according to claim 1, wherein the steering control element is a steering wheel.

3. The vehicle steering system according to claim 2, wherein the essentially fixed correlation between a steering wheel rotational angle and the wheel steering angle when the steering valve is closed is cancelled in order to perform one of:

setting a different steering ratio; and enabling a vehicle dynamic management measure for stabilizing the vehicle by way of the actuator.

4. The vehicle steering system according to claim 3, wherein the actuator is an electric motor acting between the steering wheel and the hydraulic feed unit.

5. The vehicle steering system according to claim 2, wherein the hydraulic feed unit is a piston-cylinder unit comprising a piston, which is displaceable via a spindle drive by way of the steering wheel.

6. The vehicle steering system according to claim 2, wherein the actuator is an electric motor acting between the steering wheel and the hydraulic feed unit.

7. The vehicle steering system according to claim 1, wherein the actuator is actuated as a function of actuation of the steering valve.

8. The vehicle steering system according to claim 1, further comprising a differential pressure sensor operatively configured to measure a differential pressure between the two hydraulic lines, said measured differential pressure being input to the electronic control unit for consideration in actuating at least one of the steering valve and the actuator.

9. The vehicle steering system according to claim 8, wherein the actuator is an electric motor acting between the steering wheel and the hydraulic feed unit.

10. The vehicle steering system according to claim 1, wherein the actuator is an electric motor comprising a downstream gear, which acts on the steering gearbox, the steering gearbox having a longitudinally shiftable gear element whose ends are hingeable to tie rods respectively assigned to the two steerable wheels.

11. The vehicle steering system according to claim 10, wherein the actuator is an electric motor acting between the steering wheel and the hydraulic feed unit.

12. The vehicle steering system according to claim 1, wherein the hydraulic actuating unit is a piston-cylinder unit, where a piston rod of the piston forms a gear element, the gear element having its two free ends hinged respectively to tie rods assigned respectively to the two steerable wheels.

* * * * *